June 19, 1934.  W. E. STILWELL, JR  1,963,508
RADIO CONTROL SYSTEM
Filed Nov. 13, 1929   3 Sheets-Sheet 2
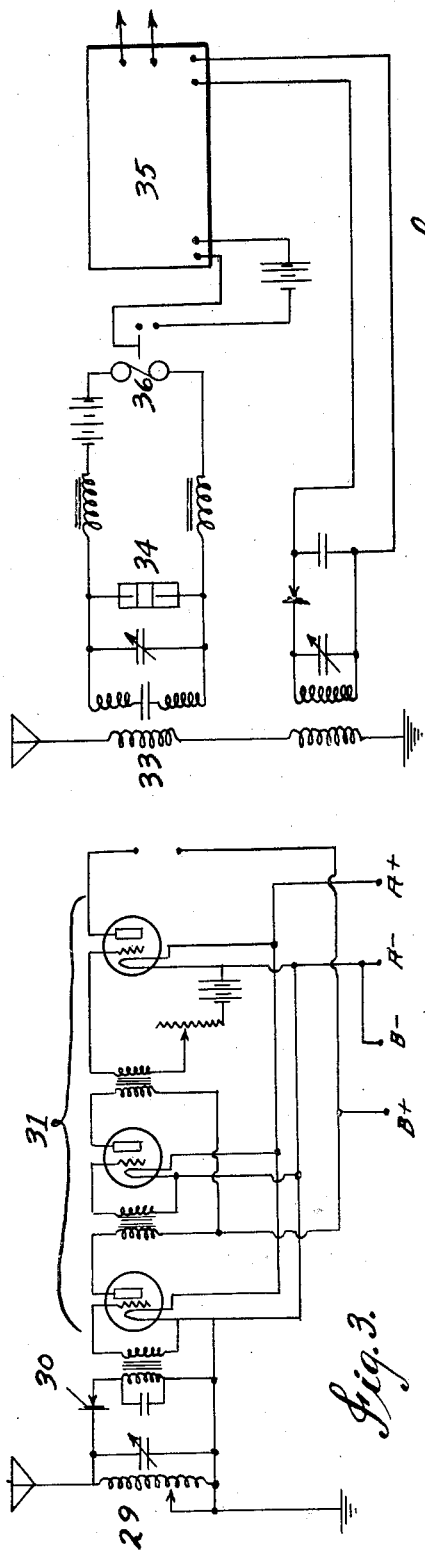
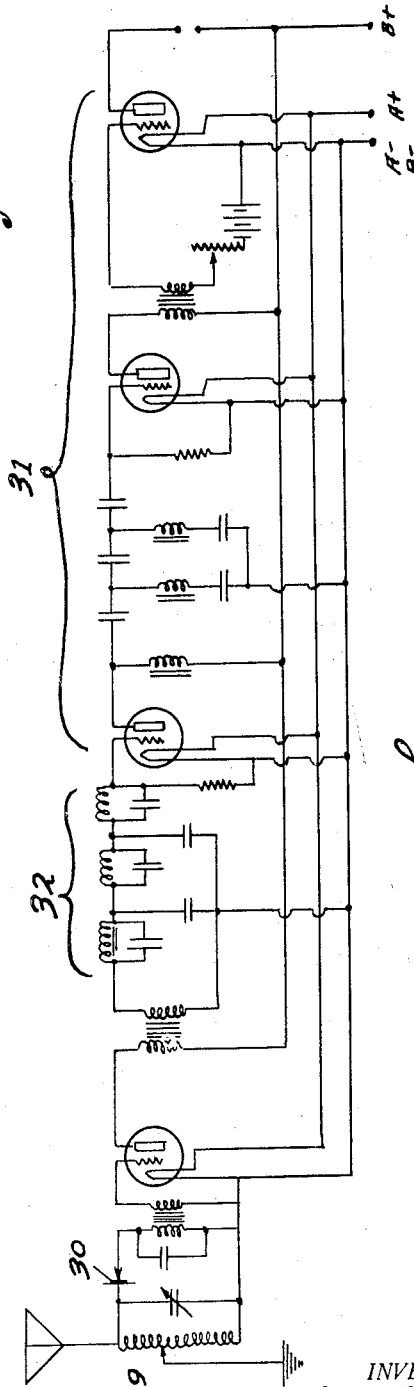
INVENTOR.
William Earle Stilwell, Jr.
BY Allen + Allen
ATTORNEYS.

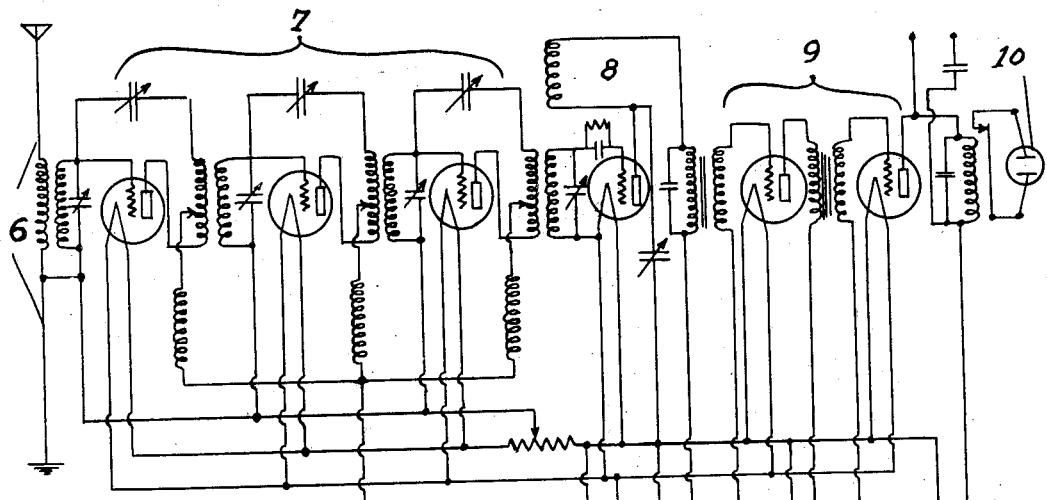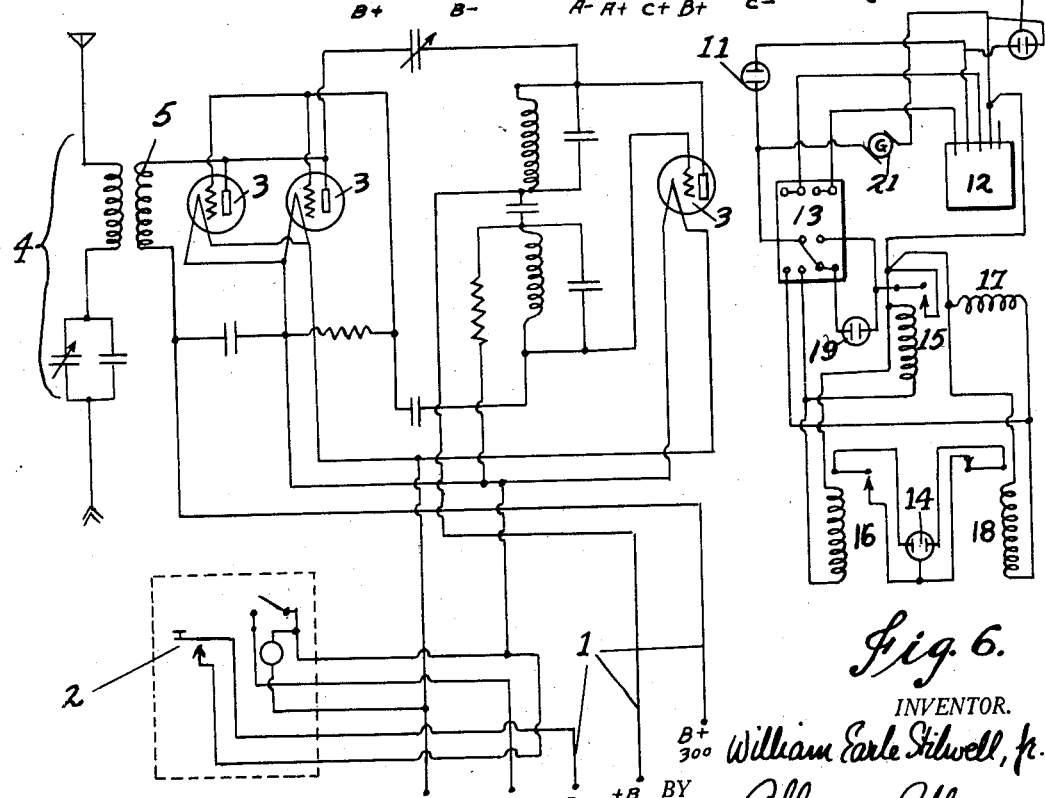

INVENTOR.
William Earle Stilwell, Jr.
BY Allen + Allen
ATTORNEYS

Patented June 19, 1934

1,963,508

UNITED STATES PATENT OFFICE 1,963,508

RADIO CONTROL SYSTEM

William Earle Stilwell, Jr., Cincinnati, Ohio

Application November 13, 1929, Serial No. 406,829

9 Claims. (Cl. 250—2)

My invention is directed to the control of remote mechanisms by radio signals, and is more particularly directed to the control of such mechanisms by a transmitter located in a moving aeroplane. My invention is of importance in a number of fields, as will hereinafter be pointed out, having to do with control from or upon moving vehicles; but the particular embodiment which I shall now describe is related to the control of the flood lighting systems, boundary lights, beacons, etc., of landing fields and air ports, by means of radio signals from a transmitter located in an aeroplane, dirigible, or the like.

For night flying, flood lighting systems for landing fields, as an example, have been found necessary; and these flood lighting systems are in general so expensive and so costly to operate, that it has been found impracticable to keep the field continuously illuminated at night. Consequently it has been necessary to devise some way of illuminating the field only during the period of an actual landing or taking off, and hitherto there has been no effective mechanism to this end. To rely upon human ears to detect the approach of an aeroplane so that the lights may be turned on, involves a considerable degree of uncertainty, and further, it is not always possible, due to a number of conditions, to get the landing field properly lighted soon enough to permit a safe landing. Again, if the aeroplane must approach closely enough to be heard, before the field can be lighted, the lighted field itself cannot serve as a guide to the pilot, or the landing may be rendered unsafe. Finally, since landing fields are for the most part primarily for the benefit of special air transport lines or individually owned planes belonging to the particular airport, it is not desirable from the standpoint of economy or otherwise to illuminate the landing field whenever any aeroplane may be heard overhead. It is possible, of course, to have regular periods of illumination of an airport, coinciding with the route schedules of a transport line or otherwise, but this is subject to obvious disadvantages and is not adequate to take care of delays or unforseen variations in schedules. A system of direct connection by radio communication between a plane and the ground is of advantage in some instances; but it also does not compensate for mistakes of time and location of the pilot, and it involves the human factor.

The object of my invention is to provide a radio control system in which the lighting of the landing field including beacons and the like, if desirable, may be under the control of a pilot in a moving air vehicle; and to this end I provide a transmitting device, as shall hereinafter be more fully explained, in an aeroplane and under the control of the pilot thereof, and a receiving station upon the ground connected for automatic operation to a flood lighting system or the like, together with such suitable features of control as will prevent the unauthorized or unintended operation of a given lighting system.

It is an object of my invention to make it possible for a pilot in the air to illuminate a landing field upon his approach. This will be found of advantage also in the case of emergency landing fields. It is another object of my invention to provide means permitting a pilot to operate the lighting system of a particular landing field which he may be approaching, without at the same time operating the lighting systems of adjacent landing fields or of other landing fields belonging to the same air transport line. My invention also has for another of its objects the provision of means whereby the flood lighting of landing fields is rendered automatic and independent of the senses of persons on the ground, and also where desired, independent of any activity upon the part of a pilot. An additional object of my invention is to provide means whereby, as a military expediency, the lights of secret landing fields may be selectively controlled from a plane in flight by those conversant with the code pertaining to such fields.

Still other objects of my invention are the provision of a relay arrangement for the operation of landing field flood lights which will permit the following through of a predetermined series of operations irrespective of signals following the initial impulse, as will hereinafter be explained; the provision of signalling means in connection with delayed-impulse mechanism to notify a pilot of the effect of his signal; and the provision of means whereby the receiving set proper need not be continuously operated, but is energized by an incoming wave so as to be rendered responsive to desired signals.

These and other objects of my invention which will be pointed out hereinafter or will be apparent to one skilled in the art upon reading these specifications, I accomplish in accordance with my invention, several embodiments of which will now be described, reference being had to the drawings which accompany these specifications.

In the drawings:

Figure 1 is a diagrammatic representation of a sending set suitable for the control of a flood lighting system upon the ground, the selectivity of which is dependent upon radio-frequency, wave length and frequency.

Figure 2 is a diagrammatic illustration of a receiving set and hook-up suitable for the operation of a flood lighting system or other device upon a landing field. This set is for use with the transmitter of Figure 1.

Figure 3 is a diagrammatic illustration of a receiving set which may be tuned to receive one or more frequencies and wave-lengths of carrier waves, and which relies for its selectivity upon modulations of the carrier wave.

Figure 4 shows in diagram a receiving set of the character of Figure 3, but equipped with a filter so as to be responsive to but one audio frequency.

Figure 5 is a type of receiving set having means whereby the first incidence of the carrier wave sets the receiver in operation, whereupon the modulated frequency operates the flood-lighting system.

Figure 6 illustrates the relay mechanism which I have found it advantageous to use for the operation of flood lights.

Figure 7:
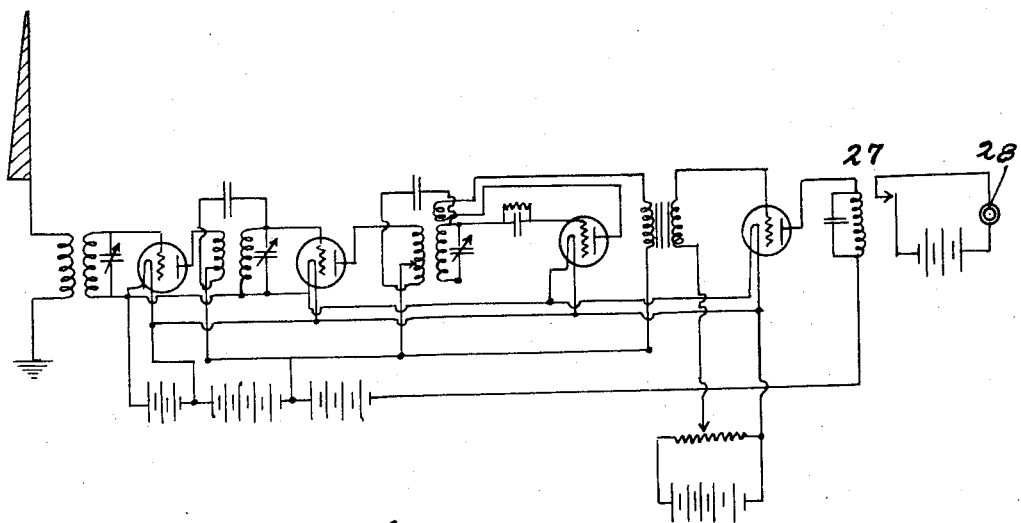
Figure 7 is a receiving set to be located in a plane for the reception of automatic signals from the ground control set operating the floodlights.

The drawings are exemplary only of suitable hook-ups adequate for the practice of my invention, and are not limiting, there being a wide variety of different hook-ups which may be made to function, or special hook-ups for special purposes.

In the practice of my invention, I equip an aeroplane or other air vehicle with a sending set comprising a source of power, means for generating radio waves, and means of control.

In Figure 1 I have shown a source of power 1 which may comprise batteries or a generator, controlled by a key or the like 2, and feeding a power tube 3 or series of them. Power is transmitted to the output circuit 4 of the transmitter, through an inductance 5.

I may equip a landing field with a suitable receiving and amplifying set, an exemplary form of which is shown in Figure 2, and comprises the usual input circuit 6, several stages of radio-frequency amplification indicated at 7, a heterodyning detector 8, and several stages of audio frequency amplification 9. The last of these stages may be connected to the relay system, an exemplary form of which will hereinafter be described, through an outlet 10. The received signal, amplified through the radio-frequency stages is heterodyned and detected, and the beat note is amplified through the audio frequency stages with sufficient power to operate a relay, as will be understood. Other forms of receiving circuit may be used.

It will now be clear that signals sent from the transmitting set in the aeroplane will actuate the receiving set and through it control the flood lighting system. I do not claim any novelty per se in the remote control of mechanisms by radio waves. My invention is addressed to a particular type of structure and means of control, several modifications of which will now be taken up in order.

The simplest form of my invention comprises a radio-frequency transmitter in a moving vehicle and radio-frequency receivers at interspaced fixed stations. Selectivity may be had by limiting the sending range of a fixed wave length transmitter so that the several stations will be actuated separately as soon as the transmitter approaches them closely enough to include them in its effective sending range. Thus by my invention a plane may be equipped with a continuously-operating transmitter which will turn on the flood lights of a landing field as soon as the plane has approached within a certain distance of the field, and, in the event no landing is made, will turn them off again when the plane has passed by, the whole operation being independent of any operator. On the other hand, if it be desired not to limit the sending range of the plane, so as not to be dependent upon favorable or unfavorable conditions for radio transmission, selectivity may be had by allotting different wave-lengths to the several receiving stations and providing means for varying at will the effective wave-lengths of the transmitter. This may be done, of course, in a number of ways, as by varying the capacity of the condenser in the output circuit, or the inductance therein, or both. Taps from the sending inductance may be brought out to a series of key connectors marked for the several interspaced receiving circuits.

With the ordinary relays, the modifications described above would be effective for flood lighting only so long as the power of the transmitter was turned on. So long as the continuous transmitter was within receiving distance of the field, or in the selective type, so long as a pilot, within sending range, held the proper station key depressed, the flood lights would remain on. This is, however, wasteful of power to some extent, and makes no provision for the possibility of power failure. Accordingly it is advantageous under certain circumstances to provide control mechanism responsive to signals separated by a time interval, one of which signals may turn on the lights, a later one turning them off. A latching relay mechanism may be employed for this end. But because the turning on of the usual B. B. T. lights on landing fields starts a cyclic operation involving the preheating of the luminous element, the dropping of a shutter, and the application of full line potential for full brilliance, and because it is advantageous that this operation, being once started shoud not be interrupted before completion, I have devised a relay arrangement having a delayed time-cycle effect.

In Figure 6, the connector 11 receives the output of the receiving set of Figure 2. 21 is a source of power for the relay system. 13 is a double-throw double contact relay of a type obtainable commercially and known as a "type MC" relay. 12 is a time delay relay, with a clock or other time interval mechanism. Such relays are also obtainable commercially, a suitable type of five contact relay being known as a type MC-9 relay.

In Figure 6 each set of contacts of the double-throw reversing relay 13 and receptacle 11 are in series with one lead of the coil of the time delay relay 12. The receptacle 11 is connected to the receptacle 10 (Figure 2) through a radio relay, the coil of which is energized by the output of the receiver.

An impulse to the receiver thus energizes the coil of relay 12, closes the contacts on this relay and starts the clock in motion. At the end of the time cycle the latching coil 15 is energized, also contactor 16 which closes the "on" circuit of the flood lights through connector 14; at the same time the coil of relay 13 is energized, thus causing the moving contact of relay 13 to move from one set of contacts to the other. During this latter operation relay 12, being, of course, disconnected, is reset for a second operation. A second impulse to the receiver energizes relay 12 as in the first impulse. At the end of the time cycle the coil of the trip relay 17 and the coil of the "off" relay 18 for the flood lights (which is in parallel with 17) are energized; at the same time the coil of relay 13 is de-energized, which disconnects, resets, and then reconnects relay 12 for subsequent operation. It is to be noted that relays 16 and 18 make contact only instantaneously, this being in keeping with the operational requirements of flood light remote control switching arrangements. The control of boundary lights can be had from receptacle 19; B. B. T. flood control is obtained through three point receptacle.

Signal lights, such for example as a green beacon, to let the pilot know that the signal has come in, may be connected to the input circuit through an outlet 22. The ground transmitter of Figure 8 may, if desired, be connected through a suitable relay to outlet 22 also; but it is better to connect it to the beacon outlet 19, if the primary purpose of the ground transmitter is to signal the turning on of the flood lights when the plane is too far away for visibility or under conditions of fog or low ceiling. Radio beacons or other signals may of course be connected either to outlet 19 or outlet 22. Any indicating means connected to 22 will show the reception of the signal; connected with 19 it will show the completion of the operation of the time relay system.

Figure 8:
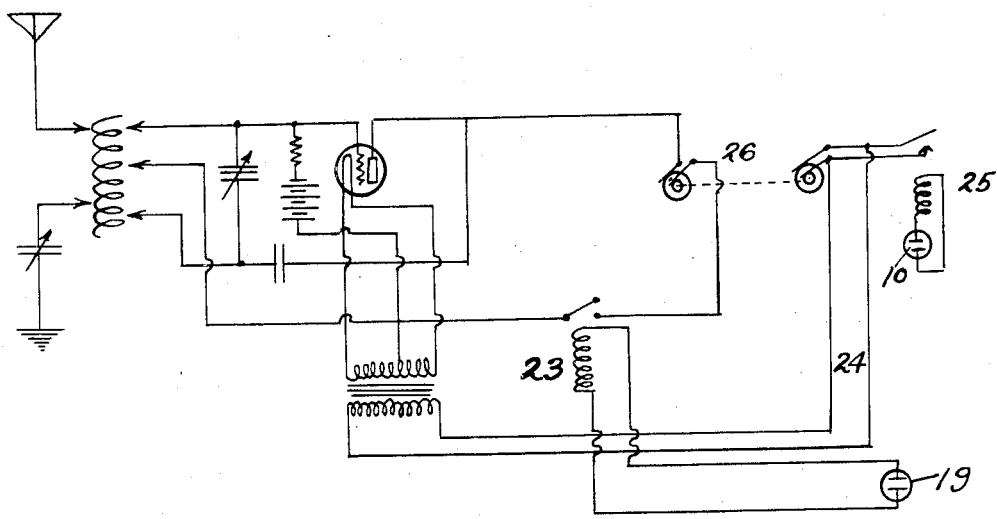
Figure 8 is a ground transmitter for signalling the pilot through the set of Figure 7.

In Figure 8, a ground transmitter is shown, in which the operating relay 23 is connected with the outlet 19 of Figure 6. The filament supply circuit 24 may be connected through a suitable relay to the outlet 10 of the set of Figure 2, so that the filaments of the ground transmitter may be warmed up by the incoming signal in time for the transmission of an impulse through the delayed-relay mechanism to operate it and thus notify the pilot. The transmitter otherwise is of a known type. It may have a mechanism 26 to produce a distinct note.

In Figure 7 a receiver in the plane, of known type, having radio- and audio-frequency stages is shown as connected through a relay 27 to a signal light 28 or other device on the instrument panel.

Radio receiver and transmitter, relying for selectivity upon limited transmission range, or different wave-lengths allotted to each station, are simple and in many circumstances an entirely satisfactory arrangement. It is possible, however, without limiting sending range and without the use of more than one radio-frequency wave-length for sender and receivers, to secure selectivity through modulating the carrier wave to different impressed waves, impulses or frequencies. Control may be had through mechanism responsive to different combinations of impulses; but it is somewhat more convenient to impress upon the carrier wave vibrations corresponding to the modulations produced by auditory signals in broadcasting. The transmitter in this case, adapted to send out a carrier wave, will be provided with means well known to modulate this carrier wave, directly or through the means of auditory signals. A suitable receiver, such as that illustrated in Figure 3, will have an input circuit (which may have radio-frequency amplifying means) indicated broadly at 29, a detector 30, and an audio-frequency amplifying means indicated at 31. This set will reproduce the signals used to modify the carrier wave, and must, of course, be used with mechanism selectively responsive to said signals. Such mechanism might be a tuned element adapted to vibrate with the signal. It may mechanically or otherwise be caused to actuate the relay system. A convenient device comprises a tuned magnetic element, such as a string, located in a magnetic field. When the string is caused to vibrate by sound from the receiving set, its movement in the magnetic field generates a relay.

Again, as in Figure 4, my receiver may be equipped with an audio frequency wave trap or filter 32 so that the output circuit of the set is responsive to but one audio frequency. This set may, of course be connected directly to a relay, or to the relay system of Figure 6.

Finally, my invention contemplates the provision of means whereby the receiving set need not be maintained in operative condition at all times, involving the continuous burning of tubes, short life, possibility of unexpected failure, and loss of power. As shown in Figure 5, I may provide a tuned receiving circuit 33, resonant to the carrier wave, and actuating a coherer 34. The tuned circuit may or may not be employed to transmit the incoming signals to the receiving set indicated at 35. The set may, if desired have a separate aerial and ground; but in either event the coherer 34 may be used to control the filament supply to the tubes of the set through a relay 36. Thus only upon the incidence of the carrier wave will the receiving set be rendered operative. The coherer may be connected through ordinary relays to the receiver in which case the tubes will function only during the incidence of the carrier wave, or the coherer may have a time relay insuring the functioning of the set for a predetermined interval. The set may be of any suitable type, such as those shown in Figs. 2, 3 and 4. The coherer may also be caused to operate signal lights or such other apparatus as is found desirable.

My invention will clearly be useful in other fields than for the control of flood lighting systems at air ports. It will be found useful wherever it is desired to actuate mechanisms at interspaced stations from a moving vehicle, such as an automobile, ship or the like. Thus the special lights of ports or harbors, or special navigation signals, may be made controllable selectively by ships at sea. Further, in connection with aeroplanes and landing fields, the invention is not limited to the actuation of flood lighting systems but will be found equally useful for the actuation alone or with floor lighting systems of other mechanisms, beacons, boundary lights and different types of signals or the like, to those in the air or upon the ground.

Various modifications of my invention may be made by those skilled in the art without departing from the spirit of my invention.

Having thus described my invention, what I claim as new and desire to secure by Letters Patent, is:—

1. In a radio control system, a receiving set adapted selectively to receive a radio signal and amplify it, a flood-lighting system requiring a cycle of operation for lighting and extinguishing, and a relay system actuated by said set and controlling said flood-lighting system, said relay system comprising a time-delay relay, and a plural circuit relay, for effecting a signal which closes a circuit of said last-mentioned relay, and rendering subsequent signals ineffective for an interval of time determined by said first-mentioned relay, after which another signal will close a second circuit of said last-mentioned relay, the circuits of said relay controlling cycles of operation of said flood-lighting system.

2. In a radio control system, a receiving set adapted selectively to receive a radio signal and to amplify the same, a flood-lighting system requiring a cycle of operation for lighting and extinguishing, and a relay system actuated by said set and controlling said flood-lighting system, said relay system comprising a time-delay device for effecting a signal, and rendering subsequent signals ineffective for a predetermined interval to permit the completion of an operation cycle of said flood-lighting system, a transmitting set, and means for causing said relay system to actuate said transmitting set.

3. In a radio control system, a receiving set located at a landing field, a flood-lighting system requiring a cycle of operation for energizing, and a time-delay relay system actuated by said set and controlling the operating cycles of said flood-lighting system, a transmitting set located in an air vehicle to actuate said receiving set, a second transmitting set located at said field to be actuated by said time-delay relay system at a predetermined point in the cycle of operation of said flood-lighting system, and a second receiving set located in said air vehicle to pick up a signal sent by said second transmitter, whereby the effectiveness of the signal of said first transmitter in actuating said flood lighting-system by said first receiving set is indicated to an occupant of said air vehicle.

4. In a radio control system, a receiving set adapted selectively to receive a radio signal and amplify it, a flood-lighting system requiring a cycle of operation for lighting and extinguishing, and a relay system actuated by said set and controlling said flood-lighting system, said relay system comprising a time-delay relay, and a plural circuit relay, for effecting a signal which closes a circuit of said last-mentioned relay and renders subsequent signals ineffective for an interval of time determined by said first-mentioned relay, after which another signal will close a second circuit of said last-mentioned relay, the circuits of said relay controlling cycles of operation of said flood-lighting system, a transmitting set, and means for causing said relay system to actuate said transmitting set.

5. In a radio control system, a receiving set comprising a receiving circuit and detecting and amplifying means, a normally open filament circuit therein, means in said receiving circuit actuated by an incoming signal to close said filament circuit, a time-delay relay system actuated by said set, a flood-lighting system controlled by said relay system, and a transmitting set having power and signal circuits, the power circuit thereof connected with and adapted to be closed by said receiving set, and the signal circuit thereof connected with and adapted to be closed by said time-delay relay system.

6. In a radio control system, a transmitting set in an air vehicle, a receiving set located at a landing field, and connected to a flood-lighting system, a control circuit for said receiving set tuned so that a carrier wave of a given wave length will turn on said receiving set, and means in said receiving set that will turn on said floodlight when a predetermined wave is impressed on said carrier wave.

7. In a radio control system, a receiving set adapted selectively to receive a radio signal and to amplify the same, a flood-lighting system requiring a cycle of operation for lighting and extinguishing, and a relay system actuated by said set and controlling said flood-lighting system, said relay system comprising a time-delay device for effecting a signal and rendering subsequent signals ineffective for a predetermined interval to permit the completion of an operation cycle of said flood-lighting system.

8. In a radio control system, a receiving set adapted selectively to receive a radio signal and to amplify it, a flood-lighting system requiring a cycle of operation for lighting and extinguishing, and a relay system actuated by said set and controlling said flood-lighting system, said relay system comprising a time-delay relay and a plural circuit relay, said relay being effected by a signal whereby it closes a circuit of said plural circuit relay thereby rendering subsequent signals ineffective for an interval of time determined by said time-delay relay, after which time another signal will close a second circuit of said plural circuit relay, the circuits of said plural circuit relay controlling cycles of operation of said flood-lighting system.

9. In a radio control system, a receiving set adapted selectively to receive a radio signal and to amplify it, a flood-lighting system requiring a cycle of operation for lighting and extinguishing, and a relay system actuated by said set and controlling said flood-lighting system, said relay system comprising a time-delay relay and a plural circuit relay, said relay being effected by a signal whereby it closes a circuit of said plural circuit relay thereby rendering subsequent signals ineffective for an interval of time determined by said time-delay relay, after which time another signal will close a second circuit of said plural circuit relay, the circuits of said plural circuit relay controlling cycles of operation of said flood-lighting system, a transmitting set, and an actuating circuit therefor, said actuating circuit being connected to one of the circuits of said plural circuit relay.

WILLIAM EARLE STILWELL, Jr.